US008161288B2

(12) United States Patent (10) Patent No.: US 8,161,288 B2
Newman et al. (45) Date of Patent: Apr. 17, 2012

(54) SECURE USER ACCESS SUBSYSTEM FOR USE IN A COMPUTER INFORMATION DATABASE SYSTEM

(75) Inventors: Gary H. Newman, Concord, MA (US); James W. Franklin, Pepperell, MA (US)

(73) Assignee: Belarc, Inc., Maynard, MA (US)

( * ) Notice: Subject to any disclaimer, the term of this patent is extended or adjusted under 35 U.S.C. 154(b) by 820 days.

(21) Appl. No.: 10/856,143

(22) Filed: May 28, 2004

(65) Prior Publication Data

US 2004/0260952 A1 Dec. 23, 2004

Related U.S. Application Data

(60) Provisional application No. 60/473,650, filed on May 28, 2003.

(51) Int. Cl.
*G06F 21/00* (2006.01)
(52) U.S. Cl. ........................................ 713/182
(58) Field of Classification Search .................. 713/182
See application file for complete search history.

(56) References Cited

U.S. PATENT DOCUMENTS

| | | | | |
|---|---|---|---|---|
| 4,905,163 | A * | 2/1990 | Garber et al. | 706/55 |
| 5,625,783 | A * | 4/1997 | Ezekiel et al. | 719/320 |
| 5,892,909 | A * | 4/1999 | Grasso et al. | 709/201 |
| 5,990,892 | A * | 11/1999 | Urbain | 715/853 |
| 6,141,778 | A * | 10/2000 | Kane et al. | 726/4 |
| 6,202,066 | B1 | 3/2001 | Barkley et al. | |
| 6,834,372 | B1 * | 12/2004 | Becker et al. | 715/234 |
| 7,191,435 | B2 * | 3/2007 | Lau et al. | 717/168 |
| 7,657,499 | B2 | 2/2010 | Newman et al. | |
| 2001/0043696 | A1 * | 11/2001 | Pinard | 379/265.01 |

(Continued)

FOREIGN PATENT DOCUMENTS

EP 0697662 2/1996

(Continued)

OTHER PUBLICATIONS

Gao J. Z. et. al.: "Developing An Integrated Testing Environment Using the World Wide Web Technology", Computer Software and Applications Conference, 1997. Compsac '97 Proceedings, The Twenty-First Annual International Washington, DC, USA Aug. 13-15, 1997, Los Alamitos, CA, USA, IEEE Comp. Soc. US Aug. 13, 1997, pp. 594-601.

(Continued)

*Primary Examiner* — Benjamin Lanier
*Assistant Examiner* — Cordelia Zecher
(74) *Attorney, Agent, or Firm* — Cesari and McKenna, LLP; Patricia A. Sheehan

(57) ABSTRACT

A user access security subsystem of a computer information database system utilizes computer grouping criteria and user type criteria to control user access to both computer profile data and system administrative features. Computer grouping criteria determine profile data access for the respective users. User type criteria determine which administrative features are accessible to the respective users, thus what administrative authority is delegated to the users. Combining computer grouping and user type criteria restricts a given user to exercising the delegated administrative authority only with respect to the particular grouping of computers to which the user has been granted access through the associated login group. To maintain access security, a given user may grant to another only those access rights that are equal to or more restrictive than the given user's rights. The subsystem enforces access restrictions by tailoring the user interface based on the associated login group and user type.

51 Claims, 5 Drawing Sheets

U.S. PATENT DOCUMENTS

| | | | |
|---|---|---|---|
| 2001/0047485 A1* | 11/2001 | Brown et al. | 713/201 |
| 2002/0059201 A1* | 5/2002 | Work | 707/3 |
| 2002/0059404 A1* | 5/2002 | Schaaf et al. | 709/220 |
| 2002/0065796 A1* | 5/2002 | Cohen | 707/1 |
| 2002/0083059 A1* | 6/2002 | Hoffman et al. | 707/9 |
| 2002/0116642 A1 | 8/2002 | Joshi et al. | |
| 2002/0129135 A1* | 9/2002 | Delany et al. | 709/223 |
| 2003/0078932 A1 | 4/2003 | Kaiserwerth et al. | |

FOREIGN PATENT DOCUMENTS

| | | |
|---|---|---|
| WO | WO/03/015342 | 2/2003 |

OTHER PUBLICATIONS

"Administration of Graphic User Interface And Multimedia Objects Using Cooperative Processing", IBM Technical Disclosure Bulletin, IBM Corp. New York, US, vol. 37, No. 9, Sep. 1, 1994, pp. 675-678.

* cited by examiner

| USER TYPE | USER RIGHTS ||||||| 
| --- | --- | --- | --- | --- | --- | --- | --- |
| | SYSTEM-WIDE FUNCTIONS | MODIFY GROUPS | MODIFY USERS | REMOVE PROFILES | VIEW REPORTS | DOWNLOAD CLIENT |
| FULL ADMINISTRATOR | X | X | X | X | X | X |
| GROUP ADMINISTRATOR | | X | X | X | X | X |
| USER ADMINISTRATOR | | | X | X | X | X |
| PROFILE ADMINISTRATOR | | | | X | X | X |
| VIEW REPORTS ONLY | | | | | X | |
| DOWNLOAD CLIENT ONLY | | | | | | X |
| NO RIGHTS | | | | | | |

*FIG. 2*

BelMANAGE    PC Management by Belarc
for Company

Getting Started
» Discovery/Client
» Systems
» Security
» Hotfixes
» Software
» Custom Reports
» Change History
» Search
» Trends
» Administration
  Current Status
  Users
  Groups
  Grouping Method
  Upload Schedule
  Remove Profiles
  Security Audit
  Software Licenses
  Software Names
  Software Lists
  Custom Reports
  Change Password
» Support
» Log Off 402 { (brace around Administration sub-items)

Current Group: [Company ▾]
- Company
- Company\East
- Company\fose_obfuscated
- Company\fose_obfuscated\Grp1
- Company\fose_obfuscated\Grp2
- Company\fose_obfuscated\Grp3
- Company\fose_obfuscated\Grp4
- Company\fose_obfuscated\Grp5
- Company\fose_obfuscated\Grp6
- Company\fose_obfuscated\Grp2

406

| | | | |
|---|---|---|---|
| Previous Build: | 05/27/2004 15:46:00 | 59 minutes ago | ran 1 minute |
| Next Scheduled: | 05/27/2004 15:46:00 | 42 minutes ago | |
| Errors during Reports: | 0 | | |
| Profiles | | | |
| Previous Storing: | 05/27/2004 15:28:24 | 59 minutes ago | ran 0 minutes |
| Next Scheduled: | 05/27/2004 15:45:00 | 43 minutes ago | |
| Last Client Upload: | 05/27/2004 05:17:54 | 11 hours, 10 minutes ago | |
| User Activity | | | |
| Last Access: | 05/27/2004 16:28:15 | 0 minutes ago | |
| Current Logins: | 1 | | |
| Miscellaneous | | | |
| BelManage Version: | 6.0k | | |
| Database Type: | SQL Server | | |
| Client Installer: | 6.1c | | |
| Hotfix Descriptions: | 05/27/2004 15:29:29 | 58 minutes ago | |

[Refresh]  406

FIG. 4A

BelMANAGE — PC Management by Belarc

*for Company*

- Getting Started
- » Discovery/Client
- » Systems
- » Security
- » Hotfixes
- » Software
- » Custom Reports
- » Change History
- » Search
- » Trends
- » Administration
  - Current Status
  - Remove Profiles
  - Change Password
- » Support
- » Log Off

402

Current Group: Company\East — 406

Current Status

| Reports | | | |
|---|---|---|---|
| Previous Build: | 05/27/2004 15:28:59 | 1 hour, 0 minutes ago | ran 1 minute |
| Next Scheduled: | 05/27/2004 15:46:00 | 43 minutes ago | |
| Errors during Reports: | 0 | | |

| Profiles | | | |
|---|---|---|---|
| Previous Storing: | 05/27/2004 15:28:24 | 1 hour, 1 minute ago | ran 0 minutes |
| Next Scheduled: | 05/27/2004 15:45:00 | 44 minutes ago | |
| Last Client Upload: | 05/27/2004 05:17:54 | 11 hours, 11 minutes ago | |

| User Activity | | |
|---|---|---|
| Last Access: | 05/27/2004 16:29:33 | 0 minutes ago |
| Current Logins: | 1 | |

| Miscellaneous | | |
|---|---|---|
| BelManage Version: | 6.0k | |
| Database Type: | SQL Server | |
| Client Installer: | 6.1c | |
| Hotfix Descriptions: | 05/27/2004 15:29:29 | 1 hour, 0 minutes ago |

Refresh

400

FIG. 4B

SECURE USER ACCESS SUBSYSTEM FOR USE IN A COMPUTER INFORMATION DATABASE SYSTEM

CROSS-REFERENCE TO RELATED APPLICATIONS

The present application claims the benefit of U.S. Provisional Patent Application Ser. No. 60/473,650, which was filed on May 28, 2003, by James W. Franklin and Gary H. Newman for a SECURITY ARRANGEMENT IN A COMPUTER INFORMATION DATABASE SYSTEM and is hereby incorporated by reference.

BACKGROUND OF THE INVENTION

1. Field of the Invention

The invention relates generally to systems and methods of managing profile data for a plurality of computers and, more particularly, to systems and methods of managing user access to the profile data and associated reports.

2. Background Information

A computer profile includes computer configuration data, such as data that identifies the computer hardware and software. The profile may also include other information, such as, for example, associated software license information, performance data, and other user specified data. In a prior system for managing a computer information database that contains computer profile data, a profile group managing server manages the data according to a tree-structured grouping of the computers. The tree structure, which is designated by the system administrator, may, for example, follow the organizational chart of a company, with the top level node, or group, corresponding to the company and lower level nodes, or groups, corresponding to the various branch offices, and so forth. In the example, the computers may be grouped according to their IP subnets that correspond to the branch offices. The profile group managing server then manipulates the profile data to produce reports that summarize the attributes of the computers at every group level, with reports for a given group including the profile data for all computers in the sub-tree that has the group as its root.

The system controls access to profile data records, and thus, access to reports, through user login groups. The respective login group of a user specifies that the user has access to profile data for that computer group and any subgroups thereof. As an example, a user in a particular branch office has as a login group the associated branch office group, and so has access to the profile data of computers that are included in the associated branch office group and any subgroups thereof. The user does not, however, have access to the profile data of computers in peer groups, or superior groups, such as the company group, which includes all of the computers in the company. In contrast, a user in the company head office that has the company group as his login group has access to the profile data provided by the computers in the company group. One such computer information database management system is the BelManage system (version 6) produced by Belarc, Inc., of Maynard, Mass., which is the Assignee of the current invention.

The user login groups work well to control user access to computer profile data based on groupings of the computers. It may also be desirable to delegate administrative authority among the various groups, such that, for example, selected users in various offices of a company have access to system features relating to adding new users, adding sub-groups, and so forth. In this way, the users selected in the various departments or branch offices of the company can make timely changes to the system operations, to reflect changes in the personnel and organization of the company, the branch offices, and so forth. An important requirement for proper operation of the system, however, is that the system provide secure access to both the profile data and the system administrative features that control the data.

SUMMARY OF THE INVENTION

The current system includes a user access security subsystem that utilizes computer grouping criteria and user type criteria to control user access to both computer profile data and the administrative features of the system. The computer grouping criteria determine profile data access for the respective users. The user type criteria determine which administrative features are accessible to the respective users. The combination of the computer grouping and the user type criteria restricts a given user to exercising the delegated administrative authority only with respect to the particular grouping of computers to which the user has been granted access through the associated login group. To maintain access security, the subsystem allows a given user to grant to another only those access rights that are equal to or more restrictive than the given user's rights. Thus, the given user cannot grant access to a login group that is a peer or a superior of his own login group and/or cannot assign a user type that is associated with greater access to system administrative features than his own user type.

The user access security subsystem enforces the access restrictions by tailoring the user interface presented to the user based on the associated login group and user type. The subsystem thus determines which computer groupings are included in various menus, which function "buttons" are active, which web pages the user can view, and so forth based on the sub-tree that has the user's login group as its root and the system features available through the user's user type. For added security, the subsystem also checks the login group and user type every time the user submits a request for access to the records of a particular group, such as, for example, when the user submits a request to view a report, add a new user, and so forth. The system then grants only the requests that apply to data and/or utilize system features to which the requester has access.

The user access security subsystem provides a secure mechanism for delegating administrative authority among users associated with the various computer groupings. Selected users can then readily make changes that affect the reporting of profile data for the respective groups at appropriate times, such as when changes are made in the organization of the company, a department, and so forth.

BRIEF DESCRIPTION OF THE DRAWINGS

The invention description below refers to the accompanying drawings, of which:

FIG. 2 depicts a Users Rights Chart that illustrates user types;

FIGS. 4A-B illustrate an administrative web page with a navigation bar that is tailored for a Full Administrator user type and for a Profile Administrator user type, respectively.

DETAILED DESCRIPTION OF AN ILLUSTRATIVE EMBODIMENT

Figure 1:
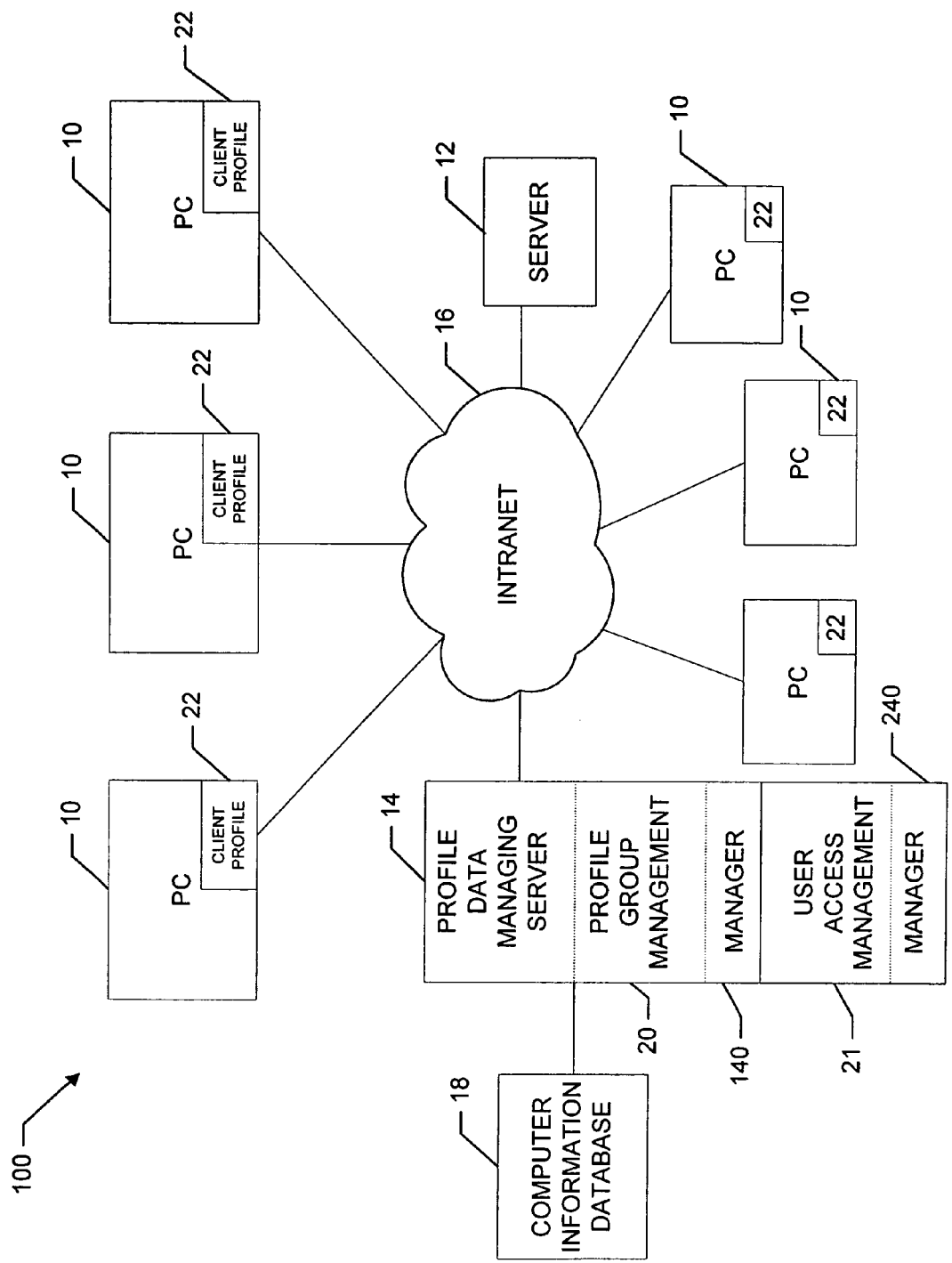
FIG. 1 is a functional block diagram of a system constructed in accordance with the current invention.

Referring now to FIG. 1, a company operates a network 100 that includes various computers 10, some of which may be workstations, laptops, servers or other devices (not shown) that communicate over an intranet, which is denoted in the drawing by the reference numeral 16. A server 14, which is the profile data managing server, manages a computer information database 18 that contains profile data for the computers on the intranet 16 and any other computers (not shown) that are under company control. Hereinafter, all computers under control of the company are referenced as "computers 10." The server 14 runs profile group management software, which is denoted in the drawing by the reference numeral 20, and user access management software, which is denoted by the reference numeral 21. For ease of understanding, the server 14 will sometimes be referred to herein as a profile group manager 140 and/or a user access manager 240 as depicted by dotted lines in the drawing.

The computers 10 run client profiling software that, at the respective computers, collects profile data and uploads the data to the profile data managing server 14. The client profiling software is denoted in the drawing by the reference numeral 22. The profile group manager 140 manages the computer profile data by grouping the computers into a specified tree-structure of groups, possibly based on primary and/or secondary grouping criteria, or in accordance with manual grouping dictated by the system administrator. The profile group manager then manipulates the data to produce reports that summarize the attributes of the computers in the various groups, with each report for a given group summarizing the attributes of the computers in the groups that are in a sub-tree with the given group as its root.

The primary and secondary grouping criteria are based on selected methods of grouping, such as IP Address, Windows Domain, Windows Login, PC Name and so forth, as described in the co-pending U.S. patent application Ser. No. 10/627,191 entitled GROUPING OF COMPUTERS IN A COMPUTER INFORMATION DATABASE SYSTEM, filed Jul. 25, 2003.

The grouping criteria or manual grouping may produce groups that essentially correspond to the underlying organization of the network 100 and/or the company. An example of computer groupings that correspond to the underlying organization of a company is a company-wide group, branch office or regional groups, department groups within each of the respective branch offices groups, and so forth, as discussed in the co-pending application. The profile group manager 140 may thus group the computers into separate groups for east and west regional offices, and further for sales and marketing departments. The groups are then:

Company/West/
Company/West/Sales/
Company/West/Marketing/
Company/East/
Company/East/Sales/
Company/East/Marketing/

The profile group manager produces reports organized by the company, by regional groups and by the respective sales and marketing department groups. The reports for the East group include information relating to the computers in groups that are in the sub-tree with the East group as its root. Thus, the report includes information relating to the East/Sales and East/Marketing groups and any subgroups thereof (not shown).

The user access manager 240 manages user access to computer profile data based on computer grouping criteria and user types. The users have access to profile data through login groups, which identify the computer groups to which the user has access. A user who is assigned a single login group that corresponds to one of the regional offices, for example, the East office, has access only to the profile data of the computers that are in the East group, and the Sales and Marketing sub-groups thereof. The user does not, however, have access to the profile data of the computers in other regional groups, such as, the West group, or any sub-groups thereof. Further, the user does not have access to the profile data of the computers in, for example, the superior company group.

The user types specify what type of access the users actually have to the profile data, by specifying the system administrative features to which the associated users have access. Each user type is associated with access to system administrative features that correspond to the exercise of particular administrative authority. A given user can access only those administrative features associated with his assigned user type, and thus, can exercise only the associated administration authority.

The subsystem utilizes a combination of the user type and login group that are associated with a given user to ensure that the user acts within his administrative authority and exercises that authority only with respect to the computer groupings to which the user has been granted access. Thus, the subsystem ensures that system administrative authority can be readily and in a secure manner delegated to selected users across the company.

Referring now to the chart shown in FIG. 2, there are, in the example, seven user types, namely, Full Administrator, Group Administrator, User Administrator, Profile Administrator, View Reports Only, Download Client Only, and No Rights, which is the default user type. As shown by the chart of FIG. 2, the respective user types, other than the default type, are associated with various sets of "user rights," which as discussed below define the administrative features to which the user type has access. The Full Administrator has all of the user rights, the Group Administrator has somewhat fewer user rights, and so forth.

The system-wide rights allow modification of certain functions that affect all users and groups in the system. The system-wide rights include access to system features that affect the grouping of profile data, the profile data upload schedule, and the software names, software lists and software reports.

The modify group rights allow the adding of new sub-groups and the editing of installable client options for the groups, such as the enabling or disabling of performance monitoring.

The modify user rights allow the adding of new users and the editing of certain user account attributes, such as the password, the login group, the user type, and the user's ability to change his or her own password.

The remove profile rights allow the user to remove profiles from the database.

The view reports rights allow the user to view the profile data reports.

The download client rights allow the user to download and install the client software on a computer, and thus, add the computer's profile to the database. This also confers the right to manually profile a computer (without installing a client) and add the resulting profile to the database.

In the example, a user who has the East/Sales Login Group and is assigned a View Reports Only user type can view the reports for the East/Sales computer group and any sub-groups thereof. The user can not, however, view the reports of peer East sub-groups, such as the East/Marketing group, or the reports of superior groups such as the East or company groups. Similarly, a user who has the East/Sales Login Group and is assigned a User Administrator user type can add a new user to the East/Sales group and any sub-groups thereof. The user can not, however, add a new user to the peer East/Marketing group or to the superior East group, and so forth. Further, the user may assign the new user a user type of User Administrator, or one of the user types with fewer access rights, such as the View Reports Only user type. The user can not, however, assign the new user a user type that is associated with greater user rights, such as the Group. Administrator user type.

For ease of understanding, we explain the operations of the user access security subsystem with reference to a Users Table that includes user login account records for the respective users. The record associates a user that is identified by user name and password with both a login group and a user type. As is evident to those skilled in the art, the table may consist of multiple tables, or may take any other form that associates a given user name and password pairing with the assigned login group and user type.

Figure 3:
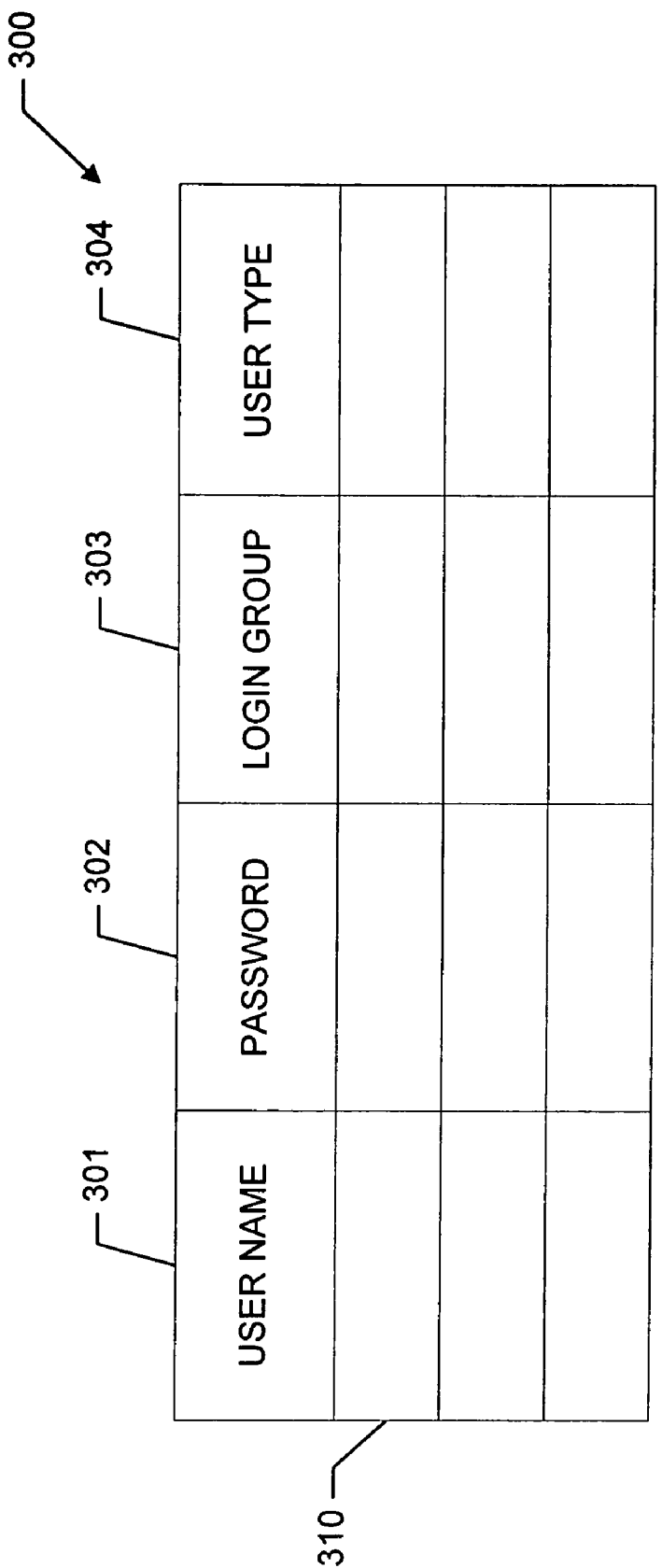
FIG. 3 depicts a Users Rights Table for use by the system of FIG. 1.

Referring now also to FIG. 3, a Users Table 300 stores records 310 for user login accounts, and maintains one record per user. The Users Table includes fields 301 and 302 for the user name and password, respectively. The table further includes a field 303 for a login group identifier and a field 304 for a user type identifier. Each login account record requires entries in all of the fields. The default entry for the user type field is an identifier that corresponds to the No Rights user type.

The login group identifier may specify the login group directly or, preferably, point to entries in one or more tables that specify the group tree and/or the sub-tree that has the designated group as its root. Alternatively, the login group identifier may be associated with multiple login groups through an associated table or list. As discussed above, the login groups are the same as or are associated with the groupings the profile group manager 140 uses for the computer profile data. Accordingly, the system can readily determine which profile data records are available to a given user based on the group tree or trees associated with the user's login group.

Each data record of a computer profile includes a GroupName string that specifies, in the form of a group tree path, the group to which the computer is assigned by the profile data manager. The access security subsystem determines that a given user has access to a particular profile data record if the group tree path associated with the user's login group is contained within the group tree path specified as the GroupName in the record. In the example, a data record for a computer in the sales department of the East regional office contains a GroupName string of Company/East/Sales/. The East login group is designated as Company/East/, and thus, a user who has the East login group has a right to access the record. The users who have East/Marketing/ as their login group do not, however, have the right to access the data record since the group tree Company/East/Marketing/ is not contained within the group tree specified by the GroupName string in the record. Similarly, if the login group is associated with multiple computer groups, the system determines if any of the associated group tree paths are contained in the group tree path specified by the GroupName string of the profile data.

In the embodiment, the respective user rights are encoded as orthogonal bits into user type words that have particular bits set or not set depending on the rights that are associated with the respective user types. The most significant bit of the word corresponds to system-wide functions, the second most significant bit corresponds to modify group rights, and so forth. The Full Administrator user type is thus designated by a word in which all of the bits are set. Similarly, the Group Administrator user type is designated by a word in which all of the bits are set except for the bit that corresponds to the system-wide functions, and so forth. The subsystem can thus readily check if a given user type has particular rights by checking if a specific bit that corresponds to those rights is set or not set in the user type word. The user type identifier included in the user's login account may be an integer (0 to 6) that indexes a table (not shown) in which the user type words are stored. The integer 6, for example, indexes to the Full Administrator user type word, the integer 5 indexes to the Group Administrator user type word, and so forth. Alternatively, the user type words may be included in the login accounts as the user type identifiers.

The data for the Users Table 300 are provided and maintained through administrative web pages. For example, a user who has modify users rights, i.e., is Full Administrator, Group Administrator or User Administrator user type, has access to the appropriate web page to instruct the subsystem to add a login account for a new user or modify the login account of an existing user. The subsystem then adds a new record 310 or changes an entry in an existing record accordingly.

To maintain profile data access security, a user can not grant to another, whether through the creation of a new user login account or a modification of an existing user login account, greater access rights than are available to the creating or modifying user. Similarly, the user may only modify users of or add a user to the given user's login group or a sub-group thereof. To ensure that the user operates within these restrictions, the subsystem customizes the user interface to provide to the user only those functions and data to which the user has access based on the associated user type and login group.

Each time a user logs on to the system, the user access subsystem looks in the Users Table 300 and performs a user name-password check in a conventional manner. If the user is authorized to log onto the system, the subsystem produces for viewing by the user a user interface that provides access to only the system features and data that correspond to the login group identifier and user type identifier included in the user's login account record 310.

The subsystem employs web page scripts that check the associated login group and user type as various pages, menus, action handlers and so forth are set up. Based on the user type, for example, the subsystem blocks access to entire web pages, inactivates particular buttons, hides features, and so forth. Further, the system may modify menus based on the associated login group, by removing from the menus the groups to which the user does not have access.

As an example, the system blocks access to an administrative page that allows users to remove PC profiles for a user who is associated with a user type for which the user type word has the remove profiles rights bit set to zero. Alternatively, the system may allow the user to view the web page but block unauthorized access to the action handler by inactivating the action handler web page that responds to the remove PC profiles submit button.

The system may also show only portions of the administrative web pages to the user. For example, after checking the user's login group the system may limit a data set to include only profiles that are members of the computer group or groups that the viewer can access and any subgroups thereof. Alternatively or in addition, after checking the user's user type, the system may hide certain functionality within a web page and/or block unauthorized user access to linked pages.

For example, a script that constructs a navigation bar 400 (FIG. 4A) on a given web page checks the viewer's user type and includes only the functionality that the viewer is authorized to access, that is, only the functionality that corresponds to the set bits of the user type word that is associated with the user type identifier that is included in the viewer's user login account. As shown in FIG. 4A, the system provides to a user that is a Full Administrator user type a navigation bar that includes a set 402 of Administration hyperlinks that link to the pages from which the user can gain access to the system features associated with, for example, altering the upload schedule, modifying users, and so forth.

Referring now also to FIG. 4B, the system presents to a user that is a Profile Administrator user type a navigation bar 400 that has a reduced set of Administration hyperlinks 402. The system thus omits from the navigation bar the hyperlinks associated with the system-wide functions, modify group and modify user rights, which are not associated with the Profile Administrator user type.

Similarly, a web page script that constructs a drop-down menu 406 for the selection of groups of interest checks the users login group and includes in the menu only the groups that the user is authorized to access. As discussed, the system includes in the menu the groups that are in the sub-tree that has the user's login group as its root. In the example, the viewer who is the Full Administrator user type has the Company/ login group. As shown in FIG. 4A, the viewer can readily select any group through the drop-down menu 406, which starts at the Company/ group. The viewer who is the Profile Administrator user type has the Company/East/ Login Group, and the drop-down menu starts at the Company/East/ group, to allow the viewer to select as the current group that particular group or any sub-group thereof.

The user access manager 240 provides further user access security by checking, for each user request submitted, that the user has access rights to both the group data and the system features required to satisfy the request. The user access manager thus checks if the computer group for which an action is requested is one of the groups to which the requester's login group provides access. Further, the user access manager checks that the requester's user type is associated with the user rights required for the requested action. In this way, the user can not gain unauthorized access by sending a request directly to the profile data manager 140 rather than making the request through the customized user interface.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention, including using multiple tables to store and maintain the user login accounts, storing pointers to various tables as one or more entries in the user login account records, associating a user name-password pairing with a plurality of login groups, associating multiple login groups and user type pairings with a given user name—password pairing, and utilizing one or more processors to perform any or all the functions performed by the secure user access subsystem.

What is claimed is:

1. A system for managing a database and controlling access to computer profile data contained in the database, the system including:
    A. a group manager server that is configured to
        i. group a plurality of computers into a tree structure of groups and sub-groups based upon grouping criteria with each group being a node on the tree and a top node being a root;
        ii. receive computer profile data uploaded from said computers, either immediately upon human command or in accordance with a profile data upload schedule, the computer profile data including one or more computer configuration data, said computer profile data providing information defining the computer's state as actually operating at an instant in time at which the data is uploaded;
        iii. store records of the computer profile data in the database; and
        iv. dynamically group the computer profile data records based on computer grouping criteria that use selected computer configuration data; and
    B. a user access manager server that is configured to
        i. associate respective users with login groups maintained in memory wherein the login group identifies the group of computers to which the user has access to the computer profile data of such computers, and which further provides access to sub-groups from that group;
        ii. associate the respective users with user types maintained in memory, the user types corresponding to sets of system administrative features that the user can exercise across the groups associated with the respective login group through which the user logs into the system, the user types specifying what type of access the respective users have to the computer profile data by specifying system administrative features to which the associated users have access, and
        iii restrict, based on the login group and user type to which a given user is assigned, the access of the given user to make changes to computer profile data, and further restricts the access of the given user to the administrative features associated with the given user's user type and to the computer profile data records stored in the database for the computers that are included in the group or groups of computer profile data records that are in the user's login group and the computers in any sub-group of the user's login group, wherein, if one of the computers changes from meeting the grouping criteria of a first group to meeting the grouping criteria of a second group, the computer is automatically re-assigned to the second group and users whose login group provides access to computer profile data from computers in the second group will automatically gain access to the computer profile data of the re-assigned computer with their user rights as conferred by their respective user type, and users whose login group provides access to the computer profile data of the first group will automatically lose access to the re-assigned computer profile data of said computer, unless the second group is a subgroup of their login group.

2. The system of claim 1 wherein the administrative features include at least one of accessing and reporting the computer profile data records stored in the database, modifying groups, modifying grouping criteria, adding users, modifying user types, creating new user types, removing profiles, viewing reports and downloading clients to one or more additional computers, determining profile data upload schedules and altering upload schedules.

3. The system of claim 1 wherein the user access manager server is further configured to restrict a given user from assigning another user to a login group that is not associated with the login group or groups associated with the given user and to restrict a given user from assigning to another user access rights that the given user does not have through the given user's association in memory with the login groups and the user types.

4. The system of claim 1 wherein the user access manager server is further configured to restrict a given user from assigning to another user a user type that is associated with access rights that the given user does not have through his association with a user type.

5. The system of claim 1 wherein the user access manager server is further configured to construct a user interface for viewing by the user and determine what to block from the view of the user based on the login group and the user type associated with the user.

6. The system of claim 1 wherein the user access manager server is further configured to block functions that relate to features that are not specified by the user type associated with the user.

7. The system of claim 1 wherein the user access manager server is further configured to inactivate user interface buttons to block access to functions that are associated with features that are not specified by the user type associated with the user.

8. The system of claim 1 wherein the user access manager server is further configured to hide from the view of the user any user interface features and functionality that are not specified by the user type associated with the user.

9. The system of claim 1 wherein the user access manager server is further configured to hide from view in a user interface for a given user any access to data associated with the group or groups of computer profile data records that are not associated with the login group of the user.

10. The system of claim 1 wherein the user access manager server is further configured to associate a given user with more than one login group.

11. The system of claim 10 wherein the respective groups of computer profile data records are in a tree-structure in memory and a given login group provides users access to the groups of computer profile data records that are on one or more sub-trees with the groups that are associated with the login group as the respective roots of the one or more sub-trees.

12. The system of claim 1 wherein the group manager server is further configured to re-group the computer profile data records when values of one or more of the profile data for one or more computers changes.

13. The system of claim 1 wherein the group manager server is further configured to re-group the computer profile data records when the selection of computer configuration data used for grouping changes.

14. The system of claim 1 wherein the group manager server is further configured to group computer profile data records based on manual groupings that use computer profile data.

15. The system of claim 1 wherein the computer configuration data includes data that identifies the computer hardware and software.

16. The system of claim 15 wherein the computer configuration data includes data selected from a group consisting of: IP address, Windows Domain, Windows Login, and PC Name.

17. The system of claim 1 wherein the computer profile data includes data selected from a group consisting of: software license information, performance data, and user specified data.

18. The system of claim 1 wherein the computer profile data is received from client profiling software executing on respective computers that collects profile data of the respective computers.

19. The system of claim 1 wherein the administrative features related to reporting the profiles comprise at least one of: viewing profile data records; removing profile data records from the database; generating lists and reports of the profile data records; managing the grouping of the profile data records; selecting computer configuration data used for grouping the profile data records; and managing sub-grouping of the profile data records.

20. The system of claim 1 wherein the administrative features related to accessing the profiles comprise at least one of: managing user rights to access the profile data records; adding or removing users; managing login groups; managing user types; managing receipt of computer profile data from the computers; and manually profiling, as a stored record in the database, computer profile data of a computer.

21. The system of claim 1 wherein access to the administrative features related to accessing and reporting the profiles are restricted for a particular user by at least one of: presentation of a tailored user interface related to the database; active or inactive function buttons of a user interface related to the database; and viewable web pages related to the database.

22. A method for managing a database and controlling access to computer profile data contained in the database, the method including:

A. grouping a plurality of computers into a tree structure of groups and sub-groups based on grouping criteria, with each computer being a node on the tree and a top node begin a root;

B. receiving computer profile data uploaded from computers, either immediately upon human command or in accordance with a profile data upload schedule the computer profile data including one or more computer configuration data, said computer profile data providing information defining the computer's state as actually operating at an instant in time at which the data is uploaded;

C. storing records of the computer profile data in the database;

D. dynamically grouping the computer profile data records based on computer profile grouping criteria that use selected computer configuration data;

E. associating respective users with login groups wherein the login group identifies the group of computers for which the user has access to computer profile data of such computers, which further provides access to all sub-groups from the group to which the user has access;

F. associating the respective users with user types that correspond to sets of system administrative features that the user can exercise across the groups associated with the respective login group through which the user logs into the system, the user types specifying what type of access the respective users have to the computer profile data by specifying the system administrative features to which the associated users have access; and G. restricting the access of a given user from making changes to computer profile data, and further restricts the access of the given user to only the administrative features associated with the given user's user type and the computer profile data of only computers that are included in the group of computers that are in the user's login group and the computers that are in sub-group of the user's login group, wherein, if one of the computers changes from meeting the grouping criteria of a first group to meeting the grouping criteria of a second group, the computer is automatically moved to the second group and users whose login group provides access to computer profile data from computers in the second group will automatically gain access to the computer profile data of the moved computer with their user rights as conferred by their respective user type, and users whose login group provides access to the computer profile data of the first group will automatically lose access to the computer profile data of said moved computer, unless the second group is a subgroup of their login group.

23. The method of claim 22 wherein the administrative features includes at least one of accessing and reporting the computer profile data records stored in the database, modifying groups, modifying grouping criteria, adding users, modifying user types, creating new user types, removing profiles, viewing reports, downloading clients, determining profile data upload schedules and altering upload schedules.

24. The method of claim 22 wherein a given user may use sets of administrative features allowing a the user to assign another user to a login group that is associated with the login group of the given user and the user may assign another user a user type that provides the same or more restrictive access rights than those accorded to the given user by his association with the user type.

25. The method of claim 22 wherein a user can exercise sets of administrative features that include the step of determining based on the associated login group and user type what to block from the view of the user in a user interface.

26. The method of claim 22 wherein a user can exercise sets of administrative features that include the step of blocking functions that relate to features that are not specified by the user type associated with the user.

27. The method of claim 22 wherein a user can exercise sets of administrative features that include the step of inactivating user interface buttons to block access to the functions that are associated with features that are not specified by the user type associated with the user.

28. The method of claim 22 wherein a user can exercise sets of administrative features that include the step of hiding from the view of the user any interface features and functionality that are not specified by the user type associated with the user.

29. The method of claim 22 wherein a user can exercise sets of administrative features that include the step of hiding from the user interface view access to data associated with the group or groups of computer profile data records that are not associated with the login group of the user.

30. The method of claim 22 further including the step of delegating particular administrative authority to a given user by assigning the user a user type that is associated with the system features that correspond to the particular administrative authority.

31. The method of claim 30 further including delegating additional authority to the given user by replacing the assigned user type with a user type that is associated with the system features that correspond to the additional administrative authority.

32. The method of claim 22 further including re-grouping the computer profile data records when values of one or more of the profile data for one or more computers changes.

33. The method of claim 22 further including re-grouping the computer profile data records when the selection of computer configuration data used for grouping changes.

34. The method of claim 22 further including grouping computer profile data records based on manual groupings that use computer profile data.

35. The method of claim 22 wherein the administrative features related to reporting the profiles comprise at least one of: viewing profile data records; removing profile data records from the database; generating lists and reports of the profile data records; managing the grouping of the profile data records; selecting computer configuration data used for grouping the profile data records; and managing sub-grouping of the profile data records.

36. The method of claim 22 wherein the administrative features related to accessing the profiles comprise at least one of: managing user rights to access the profile data records; adding or removing users; managing login groups; managing user types; managing receipt of computer profile data from the computers; and manually profiling, as a stored record in the database, computer profile data of a computer.

37. The method of claim 22 wherein utilization of the administrative features related to accessing and reporting the profiles are allowed for a particular user by at least one of: presentation of a tailored user interface related to the database; active or inactive function buttons of a user interface related to the database; and viewable web pages related to the database.

38. The method as defined in claim 22 further comprising:
    setting said user types and login groups such that a respective user needs not refer back to the user access manager prior to each time the user accesses computer profile data in the assigned login group.

39. A user access manager server that controls access to computer profile data records contained in a database, the data being provided by computers and, the profile data records being grouped in accordance with computer grouping criteria using selected computer configuration data that are part of the computer profile data received from the computers, the server being configured to:
    i. associate respective users with login groups maintained in memory, a given login group identifying the group of computers for which the user has access to the computer profile data, the login group including sub-groups thereof, said computer profile data providing information defining the computer's state as actually operating at an instant in time at which the data are uploaded;
    ii. associate the respective users with user types maintained in memory, the user types corresponding to sets of system administrative features and specifying the system administrative features to which the associated users have access,
    iii. restrict access of a given user based on the login group and the user type to which the user is associated to prevent the given user from making changes to computer profile data, and further restricting the access of the given user to only the administrative features associated with the given user's user type and the computer profile data of only computers that are included in the group of computers that are identified as being in the user's login group and the computers that are in a sub-group thereof, and
    wherein, if one of the computers changes from meeting the grouping criteria of a first group to meeting the grouping criteria of a second group, the computer is automatically re-assigned to the second group and users whose login group provides access to computer profile data from computers in the second group will automatically gain access to the computer profile data of the re-assigned computer with their user rights as conferred by their respective user types, and users whose login group provides access to the computer profile data of the first group will automatically lose access to the computer profile data of said re-assigned computer, unless the second group is a subgroup of their login group.

40. The user access manager server of claim 39 further configured to provide to a given user an interface through which the user instructs the server to assign to another user only a user type that is associated with access rights that are the same as or more restrictive than the access rights associated with the user type that is associated with the given user, the user type being associated with administrative features relating to at least one of accessing and reporting the computer profile data records stored in the database, modifying groups, modifying grouping criteria, adding users, modifying user types, creating new user types, removing profiles, viewing reports, downloading clients, determining profile data upload schedules and altering upload schedules.

41. The user access manager server of claim 39 further configured to provide to the given user an interface through which the user instructs the server to assign another user only to a login group that is associated with the login group of the given user.

42. The user access manager server of claim 39 further configured to construct user interfaces and determine based on the login group and user type associated with the user what to allow the user to view.

43. The user access manager server of claim 39 further configured to block functions that relate to features that are not specified by the user type associated with the user.

44. The user access manager server of claim 39 further configured to inactivate buttons to block access to functions that are associated with features that are not specified by the user type associated with the user.

45. The user access manager server of claim 39 further configured to hide from the view of the user any user interface features and functionality that are not specified by the user type associated with the user.

46. The user access manager server of claim 39 further configured to hide from view in a user interface the access to data associated with the group or groups of computer profile data records that are not associated with the login group of the user.

47. The user access manager server of claim 39 further configured to associate a given user with more than one login group.

48. The user access manager server of claim 47 wherein the respective groups of computer profile data records are in a tree-structure in memory and a given login group provides users access to the groups of computer profile data records that are on one or more sub-trees with the groups that are associated with the login group as the respective roots of the one or more sub-trees.

49. The user access manager server of claim 39 wherein the administrative features related to reporting the profiles comprise at least one of: viewing profile data records; removing profile data records from the database; generating lists and reports of the profile data records; managing the grouping of the profile data records; selecting computer configuration data used for grouping the profile data records; and managing sub-grouping of the profile data records.

50. The user access manager server of claim 39 wherein the administrative features related to accessing the profiles comprise at least one of: managing user rights to access the profile data records; adding or removing users; managing login groups; managing user types; managing receipt of computer profile data from the computers; and manually profiling, as a stored record in the database, computer profile data of a computer.

51. The user access manager server of claim 39 wherein the server is further configured to provide a means for allowing utilization of the administrative features related to accessing and reporting the profiles comprising at least one of: presentation of a tailored user interface related to the database; management of active or inactive function buttons of a user interface related to the database; and management of viewable web pages related to the database.

* * * * *